US007543051B2

(12) United States Patent
Greifeneder et al.

(10) Patent No.: US 7,543,051 B2
(45) Date of Patent: Jun. 2, 2009

(54) METHOD OF NON-INTRUSIVE ANALYSIS OF SECURE AND NON-SECURE WEB APPLICATION TRAFFIC IN REAL-TIME

(75) Inventors: Bernd Greifeneder, Linz (AT); Bernhard Reichl, Linz (AT); Helmut Spiegl, Linz (AT); Gunter Schwarzbauer, Linz (AT)

(73) Assignee: Borland Software Corporation, Austin, TX (US)

( * ) Notice: Subject to any disclaimer, the term of this patent is extended or adjusted under 35 U.S.C. 154(b) by 1224 days.

(21) Appl. No.: 10/455,798

(22) Filed: May 30, 2003

(65) Prior Publication Data

US 2004/0243349 A1     Dec. 2, 2004

(51) Int. Cl.
*G06F 15/16* (2006.01)
(52) U.S. Cl. ...................... 709/224; 709/227
(58) Field of Classification Search ......... 709/200–203, 709/217–227
See application file for complete search history.

(56) References Cited

U.S. PATENT DOCUMENTS

| | | | | |
|---|---|---|---|---|
| 5,742,819 | A  * | 4/1998 | Caccavale | 707/200 |
| 6,141,699 | A  * | 10/2000 | Luzzi et al. | 719/331 |
| 6,219,803 | B1 * | 4/2001 | Casella et al. | 714/38 |
| 6,286,030 | B1 | 9/2001 | Wenig et al. | |
| 6,321,264 | B1 * | 11/2001 | Fletcher et al. | 709/224 |
| 6,549,944 | B1 * | 4/2003 | Weinberg et al. | 709/224 |
| 6,973,489 | B1 * | 12/2005 | Levy | 709/224 |
| 7,007,092 | B2 * | 2/2006 | Peiffer | 709/227 |
| 7,246,101 | B2 * | 7/2007 | Fu et al. | 706/46 |
| 2002/0042828 | A1 * | 4/2002 | Peiffer | 709/227 |
| 2002/0083169 | A1 * | 6/2002 | Aki et al. | 709/224 |
| 2004/0039728 | A1 * | 2/2004 | Fenlon et al. | 707/1 |
| 2004/0068431 | A1 * | 4/2004 | Smith et al. | 705/10 |
| 2004/0078711 | A1 * | 4/2004 | King et al. | 714/43 |
| 2006/0025985 | A1 * | 2/2006 | Vinberg et al. | 703/22 |
| 2006/0089996 | A1 * | 4/2006 | Peiffer | 709/227 |
| 2007/0011321 | A1 | 1/2007 | Huntington et al. | |

OTHER PUBLICATIONS

Greifeneder, Bernd, "Revolutionizing Quality Assurance for e-Enterprise," white paper, Seque Software, Inc., Aug. 16, 2002.

"TeaLeaf Technology® Technical White Paper TeaLeaf Integritea™," white paper, Tealeaf Technology, Inc., Mar. 2002.

(Continued)

*Primary Examiner*—Moustafa M Meky
(74) *Attorney, Agent, or Firm*—Kokka & Backus, PC

(57) ABSTRACT

Provided is a method and system for monitoring and analysis of networked systems, that is non-intrusive and real time. Both secure and non-secure traffic may be analyzed. The provided method involves non-intrusively copying data from a communication medium, reconstructing this data to a higher level of communication, such as the application level, grouping the data into sets, each set representing a session, and organizing the data for chosen sessions in hierarchical fashion which corresponds to the hierarchy of the communicated information. If monitored communications are encrypted, they are non-intrusively decrypted in real time. Hierarchically reconstructed session data is used by one or more plug-in applications, such as alarms, archival applications, visualization applications, script generation applications, abandonment monitoring applications, error detection applications, performance monitoring applications, and others.

10 Claims, 10 Drawing Sheets

OTHER PUBLICATIONS

"Narus Platform: Open Collection," web page, available at 'http://www.narus.com/w/solutions/platform/collection.shtml' (original date of publication unknown, printed on Sep. 8, 2003).

"Web Applications Fail constantly," available at 'http://www.tealeaf.com/solutions/dafault.asp' (original date of publication unknown, printed on Sep. 8, 2003).

"Internal Applications," web page, available at 'http://www.tealeaf.com/solutions/internal_applications.asp' (original date of publication unknown, printed on Sep. 8, 2003).

"B2B Applications," available at 'http://www.tealeaf.com/solutions/b2b_applications.asp' (original date of publication unknown, printed on Sep. 8, 2003).

"B2C Applications," web page, available at 'http://www.tealeaf.com/solutions/b2c_applications.asp' (original date of publication unknown, printed on Sep. 8, 2003).

"Industry Solutions," web page, available at 'http://www.tealeaf.com/solutions/industry_solutions/default.asp' (original date of publication unknown, printed on Sep. 8, 2003).

International Search Report for International Applicatiion No. PCT/US04/16979, dated Apr. 18, 2007.

* cited by examiner

METHOD OF NON-INTRUSIVE ANALYSIS OF SECURE AND NON-SECURE WEB APPLICATION TRAFFIC IN REAL-TIME

FIELD OF THE INVENTION

This invention relates generally to computing systems and more specifically to the testing, auditing and monitoring of networked computing systems.

BACKGROUND OF THE INVENTION

The wide adoption of the Internet, and networked computing in general has resulted in the proliferation of networked computing systems. Networked computing systems may consist of various computers or other devices that communicate over a network. For computer networking a client server terminology is often used. A computer that makes a request over a network is referred to as a client and a computer that receives such a request and replies to it is referred to as a server. Since networked computing systems may be very complex and may be used for mission critical tasks, testing of these systems is very important. Furthermore, these systems may need to be monitored. Monitoring can have many uses such as auditing, identifying errors, or monitoring the behavior of clients who are using a server.

The testing, auditing and monitoring tasks may be accomplished by utilizing features of the software that runs on the computers of these systems. Most networking software, especially server software, includes certain testing, monitoring and auditing capabilities. But, utilizing these features may change the environment being tested or monitored. For example, if a server's speed of replying to certain requests is being monitored utilizing a monitoring feature of the server, the monitoring feature itself will use processor time and thus affect the speed with which the processor replies to requests. If software is being monitored to discover errors, the monitoring feature of the software adds an extra level of complexity which can itself be the cause of errors. The tendency of a monitoring feature to change the environment being monitored is called intrusiveness. Intrusive monitoring features usually pose an increasing risk of destabilizing the system or skewing the results of monitoring operations.

Encryption is often used in network communications. Monitoring encrypted information can be difficult, especially if such monitoring is to be performed in a non-intrusive fashion. For monitoring to be effective the information must be decrypted.

In order for monitoring to be effective for some purposes, it needs to be performed in real time, i.e., within a relatively short time of the communications being monitored. For example, for some server installations it is advantageous for errors to be detected and handled shortly after they occur. Thus, it would be advantageous to have an alert or alarm that goes off as soon as an error occurs. Similarly, alarms are useful for other kinds of events, such as degradations of performance. Furthermore, it may be advantageous for a server operator, or a support professional to know at any given time the way clients are currently using the server. If the systems that are being monitored are sensitive to downtime, it is desired that diagnostic information is obtained very soon after any errors (or other performance related events) are detected, so they can be addressed with minimal degradation to performance. Real time monitoring also allows for early discarding of unnecessary data. Some non-real time monitoring applications create large dump files of raw monitoring data that contain mostly unnecessary data and take up valuable system resources.

The communications between a server and a client may be quite complex. In particular any single communication may refer to or depend on information from other communications. Thus, it is important for monitoring purposes that related communications are examined together and their relationships noted. For example, in the case of communications in HTTP, an HTML page may refer to various picture files or frame files that have been sent at a previous time, or which must be sent at a later time.

Modern computer networking is usually described by the OSI seven layer model which is well known in the art. According to the model, data sent over a network may change its form as it passes through the utilities that service each layer. For example, at the network layer data is split up into packets and header information is added to each packet. As it is passed through a network cable the data is considered to be in layer 1 form. However, for many monitoring and testing purposes, other layers are more relevant. For example, when monitoring is done from the end-user's perspective, layer 7 is most relevant, layer 7 information is closest in form to the information entered or viewed by the end-user.

There are several known types of monitoring applications. One of them is the proxy. Proxies are usually placed on a communication channel between two or more monitored machines and actively forward messages between these machines. Proxies are intrusive, because in order to use proxies the monitored machines must be configured to address their communications to the proxy. Another intrusive feature of proxies is that they add a point of failure, that is a failure of the proxy will affect the communications going through it. In fact a failure of the proxy usually means no communications can go through it. Proxies also cause delays in communications.

Another known type of monitoring application is a server side plug-in. The server side plug-in is a software function that interacts with a server by way of an interface of the server, created specifically for server side plug-ins. Examples of such interfaces for web servers are ISAPI, NSAPI and CGI. Occasionally, the server side plug-in is directly inserted in the server software and executed by the server when predefined conditions occur. Different servers have different plug-in interfaces, thus a server plug-in will have to be specifically configured for use with one or more types of servers. Server plug-ins usually have access to OSI level 7 data (which may include the decryption of encrypted communications). But, server plug-ins change the behavior of the server by actively interacting with it. Thus, they are intrusive. The intrusive nature of server plug-ins causes performance degradation and adds a point of failure (a failed server plug-in may cause failure or performance problems with the server).

Another known type of monitoring application is the use of log files. Some communications applications, such as web servers, may be configured to continuously add data about their operation to log files. For web servers, such data is usually the URL's of web pages that have been served. Log files require storage space and applications use up additional processing resources when they add information to log files. Because the size of log files is limited by practical considerations, only limited amount of information is stored in log files. For example, message bodies are usually not stored in log files. Log files are also intrusive, because an application needs to be configured to use a log file. Thus, log files can degrade application performance, or even cause failures.

Network sniffers are non-intrusive type of monitoring devices. But, they do not have access to encrypted information. They do not possess the ability to reconstruct data to the application layer (OSI layer 7). Network sniffers usually do not process data in real time, but store data for later processing. Some network sniffers, such as intrusion detectors, may process data in real time in order to detect certain events.

SUMMARY OF THE INVENTION

The present invention is directed to a system and method for non-intrusive monitoring, auditing and testing of a network system, and compiling information, and generating scripts that may be used for testing of such a system. The present invention non-intrusively monitors communications between two or more machines, reconstructs this information to a higher OSI layer (such as the application layer) in real-time, decrypts encrypted data and outputs reconstructed monitoring information in a hierarchical fashion.

The present invention assists in the monitoring of networking systems by compiling all the contextual information relating to any event of interest. For example, if the event of interest is a website error, the present invention outputs the web-page that contained the error, and the sequence of web-pages before this page which might have caused the error, along with accompanying input information such as text typed by the end-user into web forms. Thus, the present invention may reconstruct all webpages leading to the error in the form in which they appeared to the user of the client computer. This monitoring information is organized in a hierarchical fashion according to the relationships between the different pieces of monitoring information. In this manner, an entire web application session may be reconstructed. The present invention provides these monitoring features in real-time.

The ability to obtain contextual information for each event allows the present invention to automatically create scripts that function to reproduce a session. A session can be reproduced in order to attempt to repeat an event for debugging or other purposes. Alternatively, a session may be reproduced in order to test whether an error has been properly debugged, or to test whether other systems perform in the same way as the monitored system.

Furthermore, plug-in applications may be used to provide other or additional features based on the above monitoring features. Plug-in applications are applications that use gathered monitoring data, in order to analyze it and/or provide further functionality. Plug-in applications should be distinguished from server side plug-ins and the transaction analyzer plug-in. A plug-in application may gather statistics of the operation of a server or a client in real time. Examples of useful statistics are, a list of the slowest webpages and a list of the most frequently used search terms. These statistics may be updated in real-time. Another plug-in application may capture and aggregate the text written by internet users in web forms. This data may later be used for usability or marketing studies. Another plug-in application may assist a customer support professional by showing him/her in real time all the webpages the customer has seen in a web-session. Being updated in real time, this information will be quite valuable for providing informed and efficient customer service. Similarly, a customer service professional may benefit from observing a person's web session in real time in order to provide informed phone support.

Another plug-in application may gather performance monitoring information. This may be accomplished in real-time and in a non-intrusive manner. In addition, the present invention allows both the server's and the client's performance information to be gathered. This provides the ability to determine whether a reported performance problem was caused by the server or the client. The present invention allows for gathering genuine performance monitoring information, i.e., the performance monitoring information is gathered in the course of ordinary business from real clients, in lieu of or in addition to the use of simulation or testing clients. Performance monitoring information may be combined with or embedded in reconstructed web sessions.

A plug-in application may also be used to monitor abandonment rates. Session abandonment occurs when a person leaves a website before that person completes a desired task. The desired task may be a purchase, a sign up, a download, or any other task. The present invention may further match each abandoned session with the performance monitoring information of that session and thus provide data that will be useful in determining the direct influence of performance on client conduct. Transaction abandonment occurs when a person discontinues a communication while waiting for a response form a remote computer. For example, a person may navigate an internet browser to a website which results in a request for a webpage from a server. If the person presses the stop button of his/her browser (or directs the browser to a different webpage) before the webpage has been received, transaction abandonment has occurred. Transaction abandonment can occur with or without session abandonment. Transaction abandonment information may also be combined with performance monitoring information.

Another plug-in application may detect anomalies at the transport layer (OSI layer 4) of communication, such as, abnormal number of TCP reconnects, connection timeouts, packet resends, etc. These anomalies may be a sign of a malfunctioning or improperly configured network.

Although the HTTP and HTTPS protocols are used as examples in describing the present invention, the present invention may be used to monitor applications communicating using other protocols, such as SOAP, POP3, SMTP, FTP, IMAP4, RMI, WSP/WTP. The present invention may use the TCP transport protocol as well as other transport protocols such as UDP and WDP.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which.

DETAILED DESCRIPTION OF THE EXEMPLARY EMBODIMENTS

Figure 1:
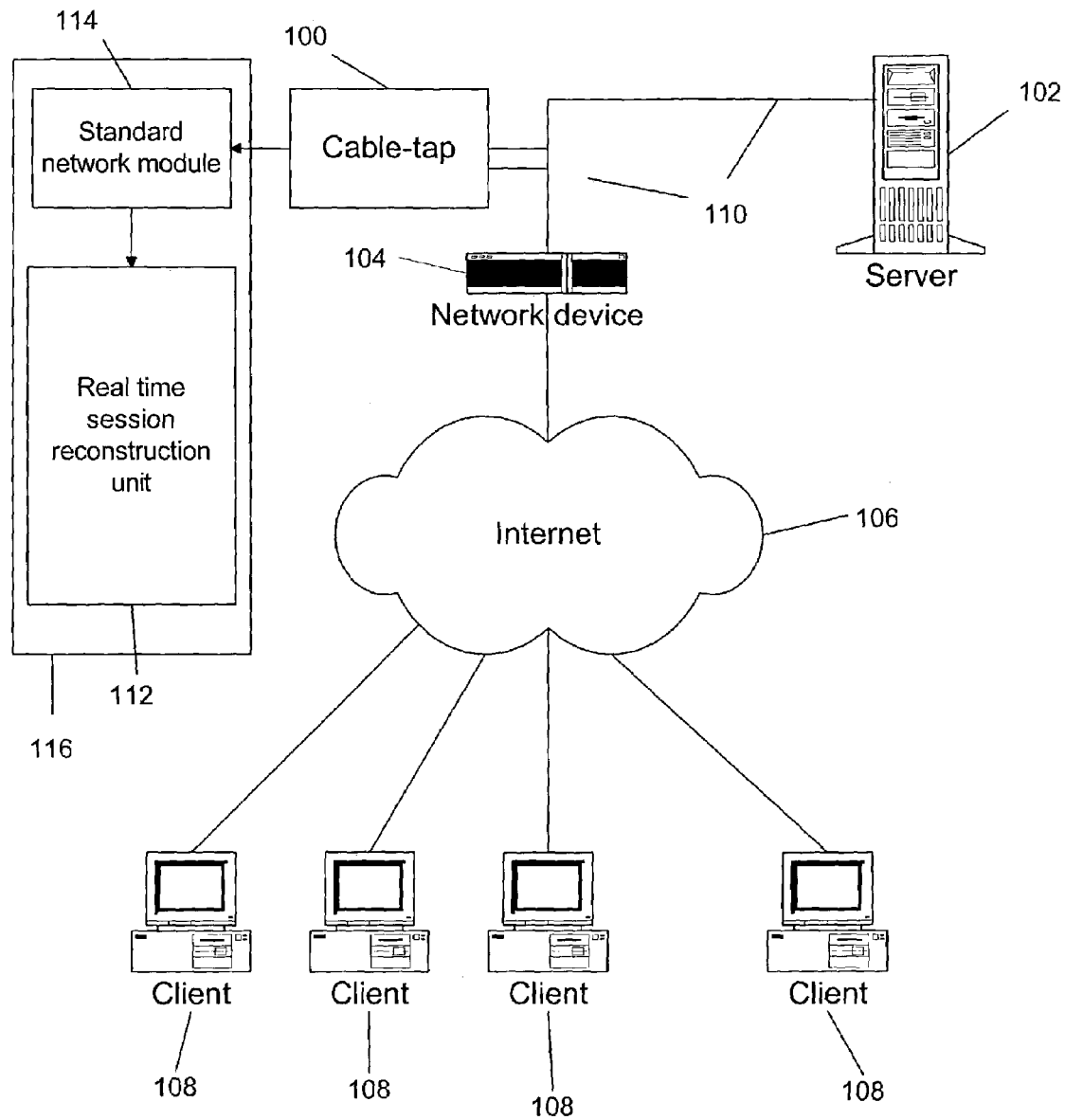
FIG. 1 is a block diagram of a network including a cable-tap.

Referring now to FIG. 1, therein is shown a communication network with a cable-tap 100. A cable-tap is a device that can non-intrusively copy all network traffic passing (in both directions) through a cable. After copying this traffic the cable-tap 100 sends it to a standard network module 114. The standard network module 114 processes the traffic and sends it to the Real Time Web Application Session Reconstruction Unit (RTSRU) 112. In a preferred embodiment the RTSRU 112 and the standard network module 114 are implemented on the same computer 116.

It is preferred that the cable-tap be fault tolerant, i.e., malfunctions with the cable-tap do not affect the network traffic passing through the cable. The cable-tap 100 can be placed on a network cable that is expected to carry communications of interest. For this reason, the cable-tap 100 should be placed in such a way that it can intercept all traffic going between the computers which should be monitored. FIG. 1 shows an example of such placement, where the cable-tap 100 is placed on a network cable 110 between the server 102 and the network device 104 closest to the server. In this example the computers which should be monitored are the server 102 and the clients 108. All network traffic passing between the server 102, and clients 108 must go through the cable-tap 102. Another desirable feature of this placement is that only traffic of interest passes through the cable-tap 102. Other placements allow for the monitoring of multiple servers and/or multiple-web applications at the same time.

In place of cable tap 100, the present invention may also utilize different methods to capture network traffic, such as utilizing a monitor port of a network switch, designed for this purpose (the RMON port). Alternatively, if the network configuration is such that all traffic of interest passes through a hub, the network traffic may be captured by simply attaching the standard network module 114 to the hub.

The network device 104 may be, but is not limited to, a router or a switch. The network device 104 is not required nor is it a part of the present invention. It is merely shown as a reference point, such devices being ubiquitous in most modern networks.

The clients 108 communicate with the server(s) 102 through the network device 104 and the internet 106. The cable-tap 100 is non intrusive, which means it is invisible to the server 102, the network device 104 and the clients 108. Thus, the elements behind the cable tap 100—the standard network module 114, and the RTSRU 112 are non-intrusive as well.

The standard network module 114 realizes the first three layers of the OSI model. It takes in network traffic in the physical layer (usually consisting of Ethernet frames) from the cable-tap 100 and processes it to transport layer packets (such as, for example, TCP, UDP or WAP packets). Possible implementations of the standard network module 114 are well known in the art. For example, one such implementation may include hardware elements, such as a network interface card (NIC), network drivers and programming interfaces that are part of most operating systems, a packet capture driver, and a packet filter. The networking hardware of an ordinary personal computer system, in addition to a modern operating system (such as Linux, Unix, Windows, etc.) and a generally available packet capture driver (which includes a packet filter) are sufficient to serve the functions of the standard network module 114. A suitable packet capture driver is WinP-CAP, provided by the Netgroup of Politecnico di Torino, and available at http://winpcap.polito.it.

The packet filter, within the packet capture driver is used to discard unnecessary packets, so as to not slow down the other components. Unnecessary packets are packets that are not sent to or from computers that are being monitored, or are not part of the protocol or protocols the present invention is configured to monitor. The packet filter is configured with the IP addresses of all computers that are being monitored, and discards the packets that do not have these IP addresses listed as either source or destination. Alternatively, the packet filter may be configured with the IP addresses of computers that are to be ignored and thus discard packets coming from or going to these computers.

A NIC usually ignores any packets that are not addressed to the computer to which the NIC is attached. Yet, for the purposes of this invention, the RTSRU 112 must receive network traffic that is not addressed to it (or the computer it is implemented on), so the NIC(s) used must be configured to accept all packets. Most NICs feature such an option, which is usually referred to as promiscuous mode.

The clients 108 are computers, or other electronic devices. These computers may be operated by human end-users, also referred to as customers. The end-users or customers are persons that are using computers online, and need not be aware of the present invention. They should be distinguished from the user 209, who is a professional that may operate the present invention.

Figure 2:
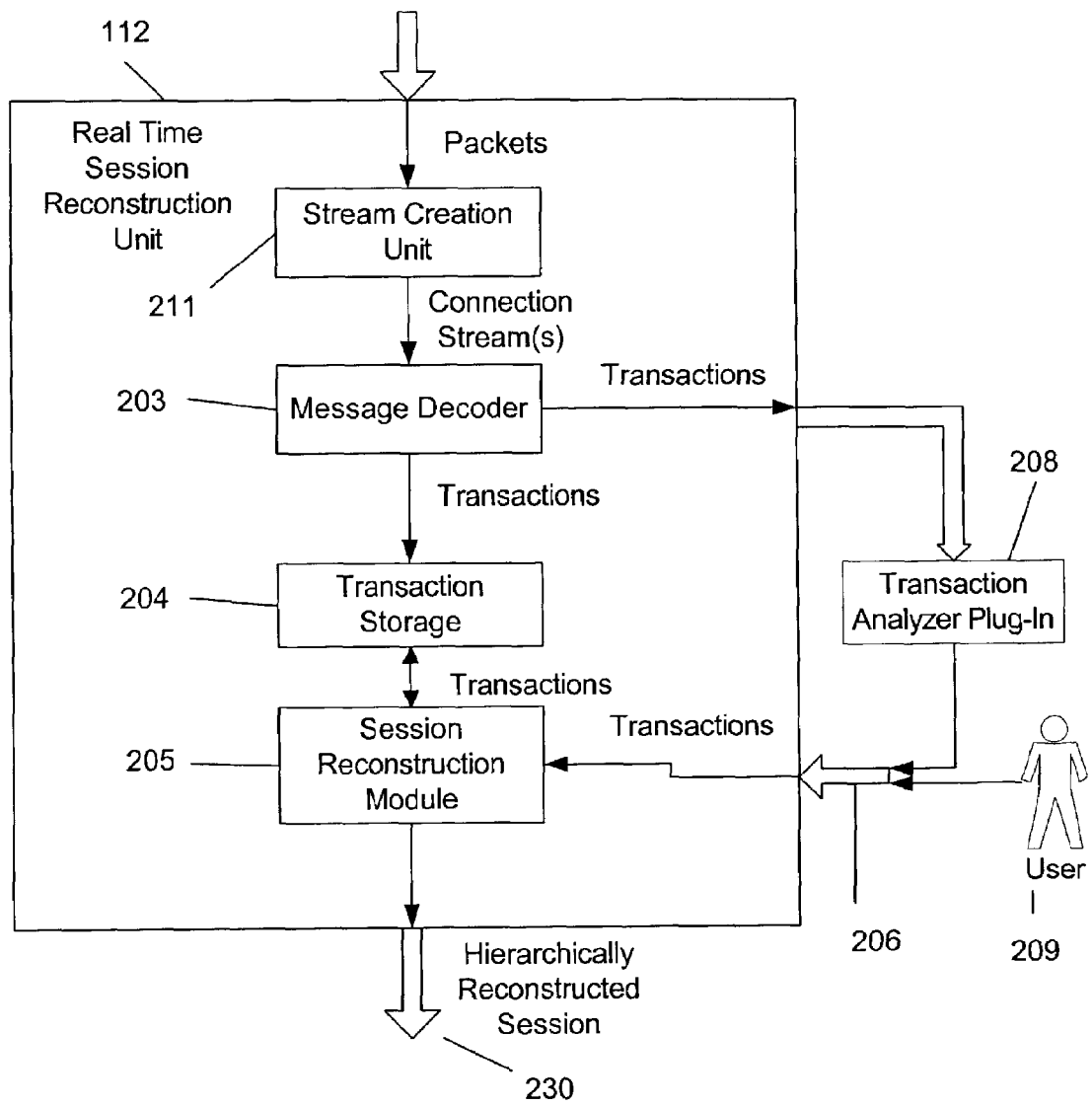
FIG. 2 is a block diagram of the Real Time Session Reconstruction Unit.

FIG. 2 is a block diagram of the Real Time Session Reconstruction Unit RTSRU 112. The RTSRU 112 receives as input the processed network layer traffic from the standard network module 114. At this point the network traffic is in the form of transport layer packets (usually TCP or UDP packets). These packets contain header and payload data. Header data refers to data needed for the transportation and handling of packets, such as destination IP address, connection-ID, etc. Payload data is the data that is meant to be communicated by the packets. The header of each packet identifies the connection to which this packet belongs to. The stream creation unit 211 examines these packets, strips them of their header data and groups the remaining payloads into connection streams, each connection stream including the payloads of packets belonging to a different connection. The stream creation unit 211 also examines timing information in the headers of packets and using such information arranges the payloads in chronological order in the stream.

Figure 3:
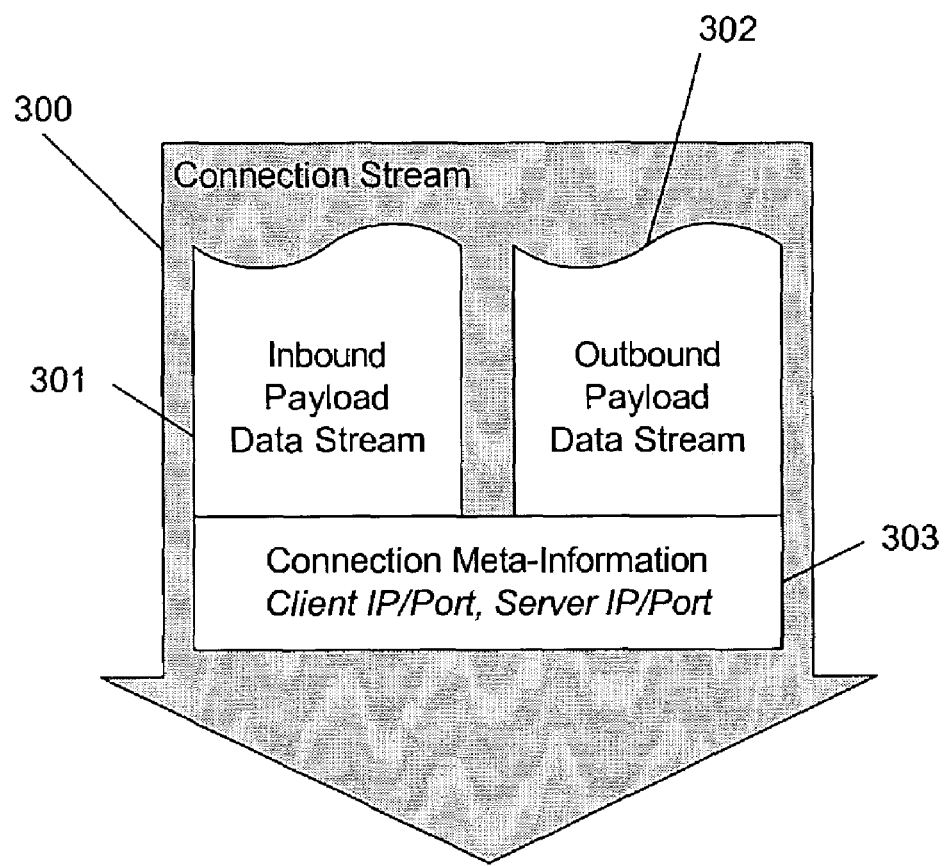
FIG. 3 is a diagram of a connection stream.

The contents of a connection stream are shown in FIG. 3. The payloads of the packets appear in the connection stream 300 in the order in which they were received and reordered by the stream creation unit 211. The relevant header data of the packets belonging to a connection is placed once by the stream creation unit 211 in the beginning of the connection stream corresponding to that connection. This data is referred to as the connection meta information 303, and may include the client IP address/port, and the server IP address/port for the connection. The stream creation unit 211 may optionally add monitoring information to the connection meta information 303, such as, for example, time stamps indicating when the connection was initiated and when it ended, a connect latency value indicating the time it took to establish the connection, flags indicating if a connection was aborted/abandoned prematurely, or TCP packet latency information for estimating client modem speeds and/or calculating the time a server needs to prepare a document (server busy time). Since a single connection includes communications between two machines flowing in two directions, the connection stream includes two sub-streams containing the payloads of the connection being transmitted in each direction. These are the inbound payload data stream 301 and the outbound payload data stream 302. The terms "inbound" and "outbound" do not reference the RTSRU 112, because the RTSRU 112 receives only a copy of both streams and as such does not actively take part in the client/server communication. In the embodiments described herein the inbound payload data stream refers to the stream of data sent from the client to the server and the outbound payload data stream refers to the stream of data sent from the server to the client. When the connection which the connection stream represents is closed, the connection stream terminates.

Referring to FIG. 2, the message decoder 203 processes all active connection streams in parallel. The message decoder 203 processes connection streams, by first decrypting the stream, if necessary, and breaking up the data of the stream into information units, each information unit comprising one or more related communications from the stream. In the embodiment shown in FIG. 2, the information units are transactions, wherein each transaction generally represents a pair of communications—a request and a response (although, as shown below, in certain circumstances a transaction may be missing a response communication). The nature of the transaction and the decryption process are also described below. Once a transaction is formed by the message decoder 203, it is stored in the transaction storage 204 and it is optionally sent to the transaction analyzer plug in 208. The transaction storage 204 serves as a means to quickly store and retrieve transactions. It uses caching and compression techniques and is usually implemented in a computer's main memory. The transaction analyzer plug in 208 scans recently created transactions in real time for predefined events of interest. Events of interest are events that may need to be monitored in real time. Examples of such events are error messages, requests coming from certain clients, response times that exceed performance thresholds, or specific predefined customer input.

The session reconstruction module 205 receives a command either from the transaction analyzer plug in 208 or a user 209 to reconstruct the session to which a transaction belongs. The transaction analyzer plug in 208 or the user 209 indicate to the session reconstruction module 205 the transaction for which a session is to be reconstructed. The session refers to a set of all other transactions that are relevant. Sessions and methods of identifying transactions as belonging to a session are described below.

The session reconstruction module 205 communicates with the transaction storage 204 in order to search for and retrieve transactions from the same session. Once all the available transactions from a session are retrieved, the session reconstruction module 205 determines the dependencies between them and organizes them in a hierarchical manner. Dependencies between transactions are found by looking for references to a transaction in another transaction. Specific methods of doing that are described below. The output of the RTSRU 112 is a hierarchically reconstructed session 230. This hierarchically reconstructed session may be viewed by users for error analysis or other monitoring purposes. It may be archived for auditing purposes, or it may be used to create a script, which may later be used to recreate the client server communication which gave rise to an event of interest. An example of an event of interest is a transaction with an error message in its body.

Figure 4:
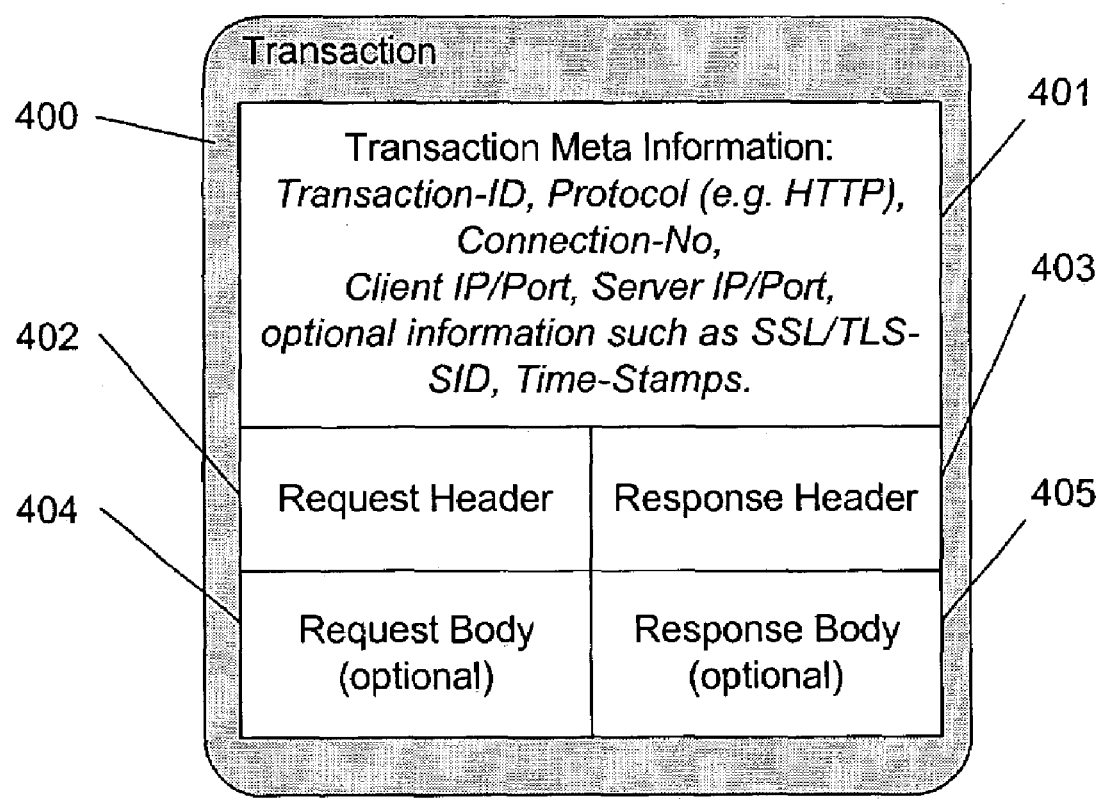
FIG. 4 is a diagram of a transaction object.

The message decoder 203 receives as input a connection stream and outputs a plurality of transactions. An exemplary transaction 400 is shown in FIG. 4, and includes a meta information field 401 which contains meta-information describing the transaction and the environment in which it occurred. Meta information may include a transaction-ID, the protocol in which the transaction was executed (for example, HTTP, RMI, FTP or WSP/WTP or SMTP), an identification number of the connection from which the transaction was extracted (the connection number), as well as the client and server IP address/port through which the transaction communications were sent and received. Since the transaction is extracted from a single connection stream, which implies a single TCP connection, both the request and response communications will be sent between the same client and server IP addresses and ports. The meta-information field may also include elements such as, for example, SSL session ID (if the communications that made up the transaction were encrypted using the SSL protocol), and time stamps that may be used for monitoring purposes. The Transaction 400 also includes a request header 402 and an optional request body 404, which together define the request, as well as a response header 403 and an optional response body 405, which together define the response.

Figure 5:
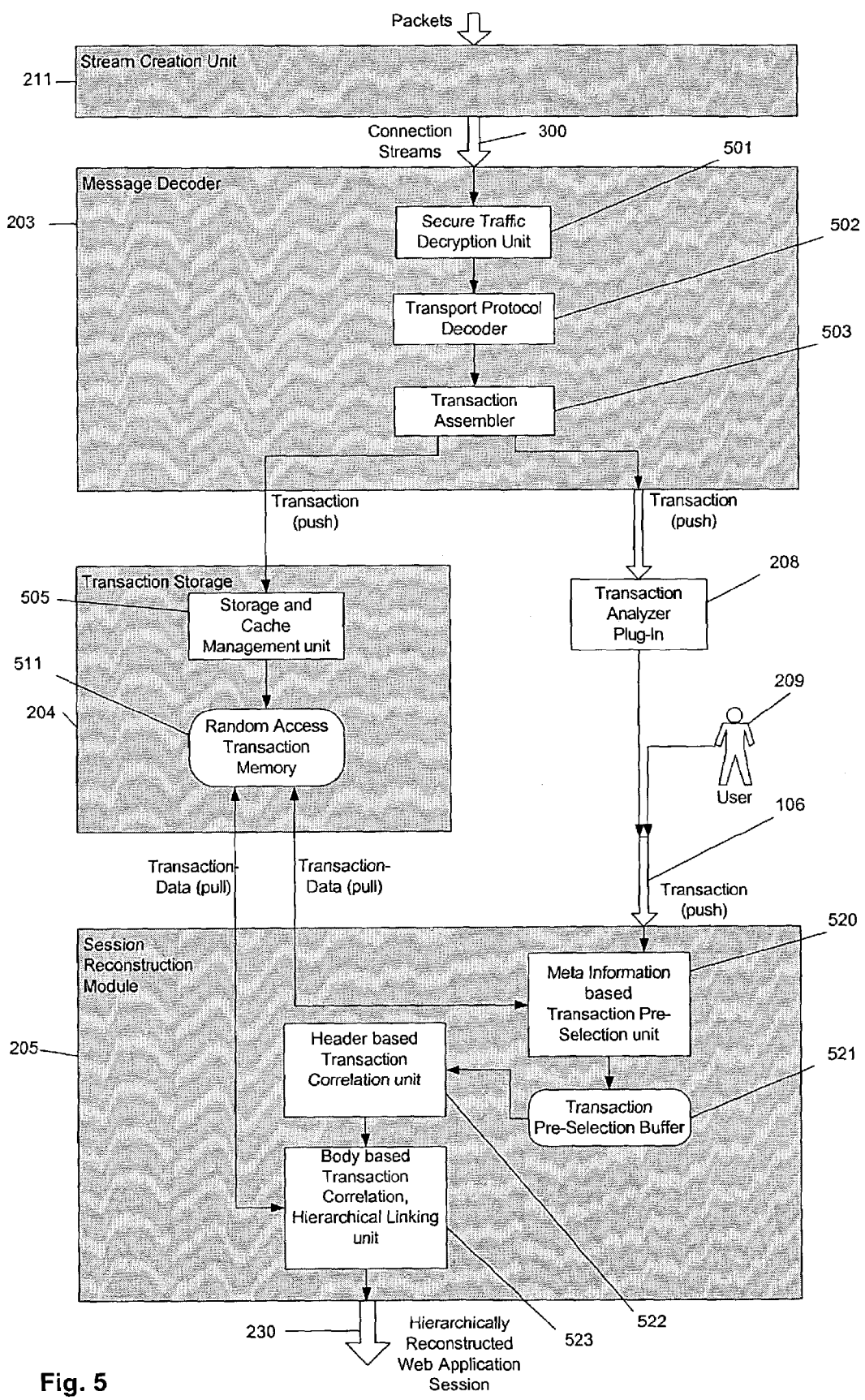
FIG. 5 is a detailed diagram of the Real Time Session Reconstruction Unit.

FIG. 5 shows a more detailed view of the RTSRU 112 configured to process HTTP communications. The Stream Creation Unit 211 groups incoming transport layer packets into connection streams 300.

The message decoder 203 includes three modules—the secure traffic decryption unit 501, the Transport protocol decoder 502 and the transaction assembler 503.

The secure traffic decryption unit 501 decrypts the connection stream 300 if necessary. Encryption in web communications is usually accomplished using the Secure Socket Layer (SSL) or a very similar protocol called the Transport Layer Security protocol (TLS). The present invention may also be used in conjunction with other security protocols, such as, for example, the Wireless Transport Layer Security protocol (WTLS). The Secure Socket Layer may use several different encryption algorithms, or cipher suits, depending on the circumstances. However, SSL usually uses a combination of a public key encryption algorithm (such as RSA) and a conventional encryption algorithm (such as RC4, or triple DES). The client generates a pre-master secret and using the public key encryption algorithm encrypts the pre-master secret and sends it to the server. A session key is generated independently by the client and the server using the pre-master secret. Since they use the same method of generating sessions keys and they base their session keys on the same pre-master secret, the client and the server generate identical session keys. Session keys are later used to encrypt and decrypt communications, by way of a conventional encryption algorithm. The public key encryption algorithm uses private keys and public keys (which are different from the session key), of which only the private keys can be used for decryption.

The secure traffic decryption unit 501 decrypts a connection stream 300 by decrypting both the inbound payload data stream 301 and the outbound payload data stream 302. In this way it differs from most encryption/decryption tools, because most such tools need to decrypt an incoming stream and encrypt an outgoing stream. In contrast to other monitoring tools the present invention does not take active part in secure communications, i.e., it does not send messages to either the server or the client nor does it participate in any key creation with the server or the client. In order to accomplish decryption in a timely manner the secure traffic decryption unit 501 needs the private key of the server (or the computer that will receive the pre-master secret). Usually providing the server's private key to another device would be considered a security flaw, since private keys are not meant to be communicated to any other party (even the encrypting party). But since it may be assumed that usually the server's owner or operator will use the present invention to monitor his/her own server, providing the server's private key to the secure traffic decryption unit 501 does not pose significant security risks.

The secure traffic decryption unit 501 then uses the server's private key to decrypt the initial stage of the SSL communication. This initial stage is called the handshake, and it is the stage in which the server and the client exchange the pre-master secret using public key encryption. Having decrypted this first stage, the secure traffic decryption unit 501 is in possession of a decrypted pre-master secret. There are different well-known methods of deriving a session key from a pre-master secret, depending on which cipher is used. The secure traffic decryption unit 501 chooses a suitable method, depending on the cipher used and generates the session key from the pre-master secret. The secure traffic decryption unit 501 then uses the session key to decrypt the rest of the SSL communication, which is conventionally encrypted, and provides it to the transport protocol decoder 502.

The transport protocol decoder 502 receives decrypted streams from the secure traffic decryption unit 501 that are in layer 6 (the presentation layer) of the OSI model. It processes these streams and outputs OSI layer 7 (application layer) messages, such as HTTP requests and responses. The transport protocol decoder 502 parses the inbound payload data stream 301 and the outbound payload data stream 302 to obtain request and response messages, respectively. Parsing is performed using standard HTTP parsing methods. Once obtained, these messages are saved in message objects that include a message header and an optional message body. These message objects, as well as the connection meta information 303 from the connection stream 300, are sent to the transaction assembler 503.

The transaction assembler 503 receives the request and response message objects and attempts to find the corresponding response message for each request message and vice versa. A request message and a response message are corresponding if the response message contains the response of a particular request, contained in the request message. Request and response message objects are matched by first arranging the request message objects and the response message objects of a single connection in chronological order, according to the time they were received by the transaction assembler 503. Then the request and response message objects are paired up according to their places in the respective chronological orders, the first request message object being paired with the first response message object, the second request message object with the second response message object, and so on. This method is effective because all messages belong to a single connection. In protocols like HTTP, the server is expected to respond to requests from any particular connection strictly in the order they were received.

Once it discovers a pair of corresponding request and response message objects, the transaction assembler 503 creates a transaction object 400 from those two message objects, repeatedly. The transaction assembler 503 sets fields 402, 404, 403 and 405 according to the information in the pair of corresponding request and response message objects. The transaction assembler creates an unique transaction ID and saves it in the transaction meta information field 401. The transaction assembler sets the other values in the meta information field 401 according to the connection meta information 303 of the connection stream 300, and optionally any other information that may be relevant, such as time stamps of messages signifying the time they were received by the transaction assembler 503. Once the transaction assembler has successfully created a transaction object, it passes that transaction object to the transaction storage 204 and optionally to the transaction analyzer plug in 208.

The transaction storage 204 includes a storage and cache management unit 505 and a random access transaction memory 511. The storage and cache management unit 505 stores the incoming transaction objects in a random access transaction memory 511. The storage and cache management unit 505 reduces redundancy by caching transactions or by using compression techniques. The random access transaction memory 511 provides a real-time interface for querying and retrieving sets of transaction objects using parameters contained in the transaction meta-information 401. The random access transaction memory 511 may be implemented using, for example, a FIFO ring buffer with a cache management tree. In the HTTP protocol, requests contain a universal resource locator (URL). Thus, the transactions that result from these requests also contain a URL. Since the URL is important in determining correlation between various transactions, in exemplary embodiments configured to handle the HTTP protocol, such as the one shown in FIG. 5, the random access transaction memory 511 has the ability to retrieve transactions by URL as well.

The optional transaction analyzer plug-in 208 analyzes transaction objects in real time as soon as they are received from the transaction assembler 503. Incoming transactions are checked for the occurrences of special conditions, such as those that are relevant to monitoring or testing of the system, and may include, but are not limited to, error messages in the transaction bodies, HTTP errors, transactions in which too much time has elapsed between the request and the response, or transactions which include specific input from an end-user. Once the transaction analyzer plug in 208 determines a certain transaction is a transaction of interest, it sends that transaction to the session reconstruction module 205. When a special condition is detected the nature of the condition is saved and is associated with the transaction, so it can later be used in conjunction with the hierarchically reconstructed web application session 230 for various monitoring purposes. Additionally, a user 209 can watch transactions as they pass through the transaction analyzer plug-in 208 and select transactions of interest.

The function of the session reconstructions module 205 is to reconstruct the session to which a particular transaction of interest belongs. In exemplary embodiments configured to process the HTTP protocol, the session refers to a web application session.

Figure 6:
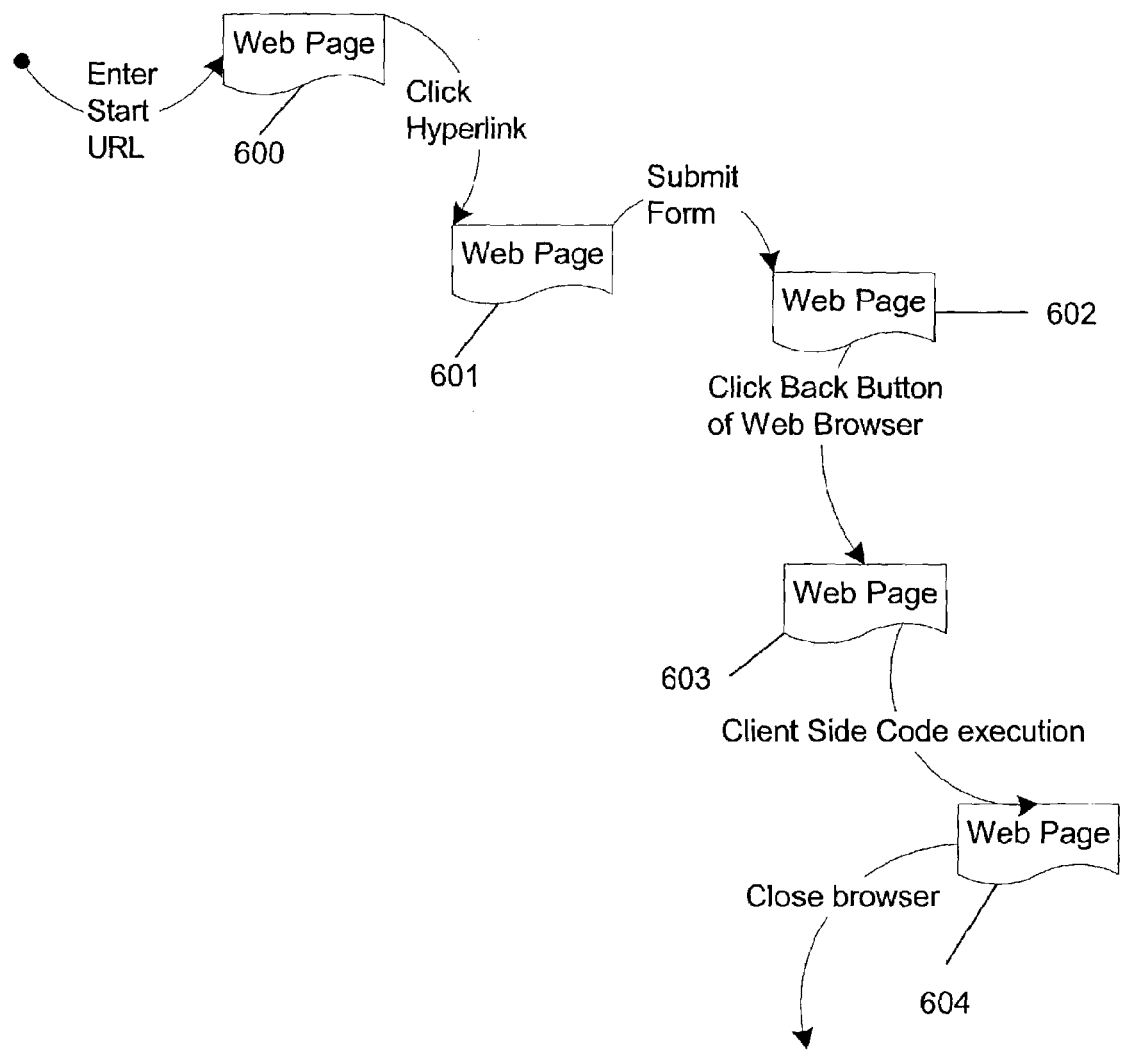
FIG. 6 is a block diagram of a web application session.

A session in general is a way to group transactions so that the grouping is useful for monitoring purposes. Thus, a session is meant to show a large picture, or a coherent process or action, accomplished by several transactions (it is, however, possible that a session consist of a single transaction). In the specific case of web applications, a session is usually defined to start when an end-user enters a monitored website (a monitored website is a website hosted on a monitored server), and to end when the end-user leaves that website, or does nothing for a specified period of time (this is referred to as a session timeout). An example of a web application session is shown in FIG. 6. The end-user reaches the first webpage 600 by entering a start URL in his/her browser. Furthermore, the end-user proceeds to other webpages 601-604 from the same website by other actions, such as clicking on a hyperlink, submitting a form, or clicking the back button of the browser or by an automated action performed by his or her computer, such as client side code execution. When the end-user closes his/her browser, the web session is terminated. In this example, the web session consists of all transactions necessary to bring webpages 600-604 to the end-user and to send the various commands to the web server.

Relevant transactions, or transactions belonging to the same session can be identified because they have the same client IP address, the same server IP address, and the same SSL/TLS session ID. But sometimes (especially when there is no SSL/TLS session ID available) the above factors may result in grouping transactions from more than one web session together. Thus, additional factors may be necessary. Fortunately, since complex websites often need to recognize sessions as well, many such websites use some additional form of session ID. Virtually any website that requires log-in or uses a "shopping cart", has a way of including a session ID with communications with the client. This session ID may be found in HTTP cookie headers, or as part of the requested URL path or within the HTTP-response body as a hidden form field in an HTML document. This session ID is also used as an important component in identifying relevant transactions.

Referring to FIG. 5, a transaction of interest may be selected either by using the transaction analyzer plug in 208, which identifies a selected transaction to the session reconstruction module 205, or by a user 209 who may identify a transaction to the session reconstruction module 205 by means of a suitable user interface.

A transaction sent from the transaction analyzer plug-in 208 or the user 209 first reaches the meta information based transaction pre-selection unit 520 (the meta info unit). This transaction is the transaction of interest. The meta info unit 520 then reads the meta information 401 of the transaction and it queries the random access transaction memory 511 using various items from the meta information field 401 of the transaction of interest as parameters. Parameters that may be used are the IP address of the client or server, or the SSL session ID. These transactions are likely to belong to the web application session of the transaction of interest.

The random access transaction memory 511 returns to the meta info unit 520 a set of transactions that match the search parameters. The meta info unit 520 places these transactions in the transaction pre-selection buffer 521 in chronological order. The set of transactions in the transaction pre-selection buffer 521 represent the result of a rather broad search. This set will be further narrowed in order to isolate the transactions that belong to the web application session of the transaction of interest (thus the term "pre-selection"). The transaction pre-selection buffer allows further searches to be performed on this broad set of transactions without accessing and slowing down the transaction storage 204.

The header based transaction correlation unit 522 narrows the set of transactions in the transaction pre-selection buffer 521, based on relevant information contained in the request header 402 and response header 403 fields of the transaction of interest. Such relevant information may include, but is not limited to, cookies, URL-path components and non-standard headers. This step is meant to discover if the web application being monitored is using a session ID that can be found in a transaction's request 402 or response 403 headers, and if so to further narrow down the transactions based on that session ID. The header based transaction correlation unit 522 passes the narrowed set of transactions to the body based transaction correlation and hierarchical linking unit 523.

The purpose of the body based transaction correlation and hierarchical linking unit 523 (body based unit) is to determine relationships between the transactions, attempt to find session ID's hidden in the bodies of transactions, retrieve the bodies of transactions with missing bodies, and reconstruct missing transactions.

The body based unit 523 parses the message bodies 402, 403 of this narrowed set of transaction objects. In the embodiments configured to handle HTTP traffic, an HTML parser is used. However, other parsers may be used in conjunction with the HTTP traffic if there is a possibility that documents in other formats, such as XML, GIF, JPG, Java Script, CSS may appear. A non-HTML parser may be used if the documents are not in HTML. While being parsed, the HTML bodies of transactions are searched for references to other transactions (or web pages consisting of a hierarchy of transactions), or information about the session the transaction belongs to. References within HTML encoded bodies to other transactions may include, but are not limited to HTML hyperlinks, HTML forms, and HTML references to embedded documents. Information about the session a transaction belongs to may include, but is not limited to, session identifications stored in hidden HTML form fields and session identifications stored in URLs of hyperlinks. These references and session information are used to discover further relationships between transactions and identify transactions as members of the session of the transaction of interest.

Figure 7:
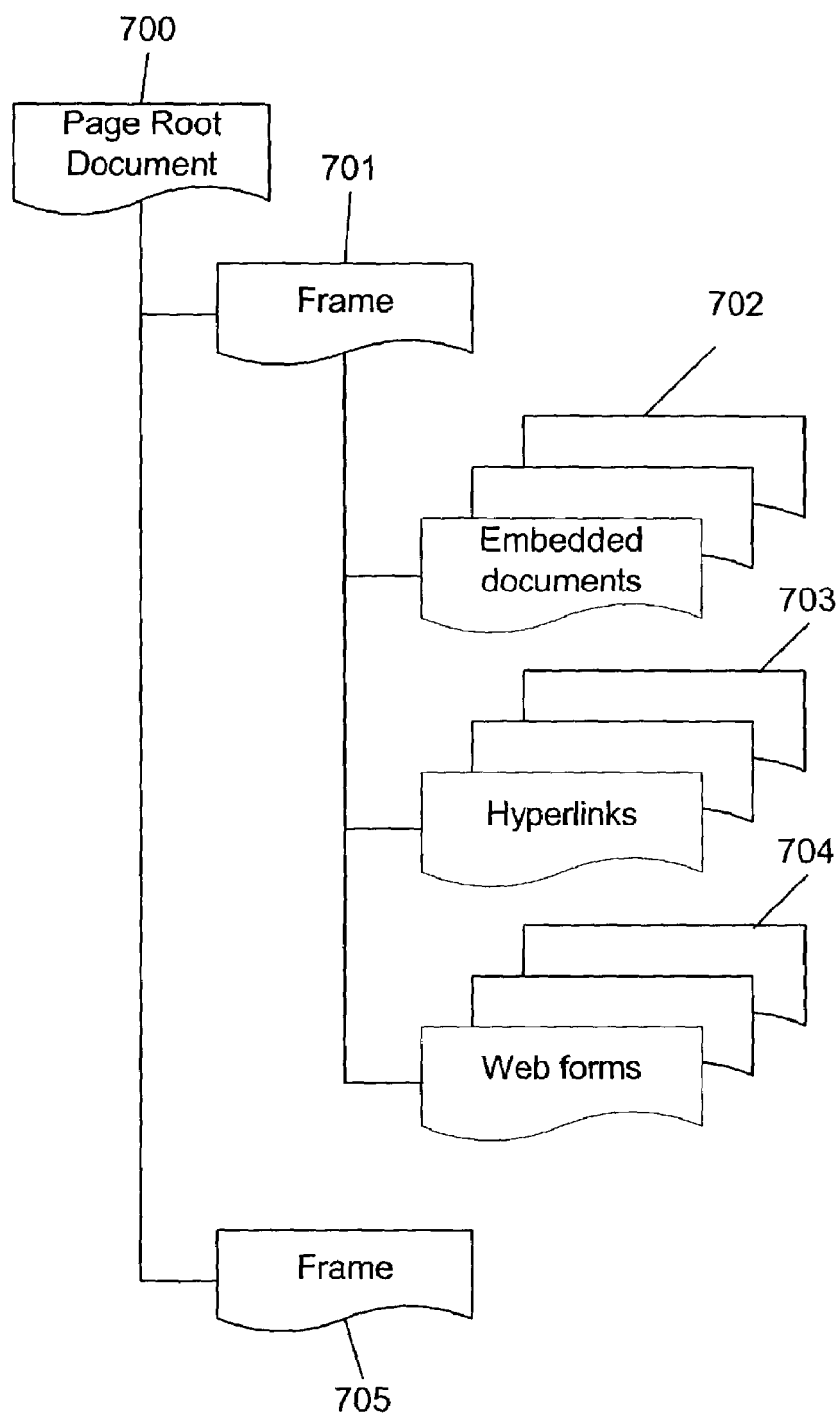
FIG. 7 is a block diagram of a data structure representing a webpage.

FIG. 7 is a diagram of a data structure that results from parsing several transactions that together represent a webpage. The page root document 700 represents the transaction that contains the main HTML code of a webpage. In this example the data structure further comprises two frame documents 701, 705, various other embedded documents 702, hyperlinks 703, and web forms 704. Hyperlinks 703 represent HTML elements within the body of the parent document frame 701. Hyperlinks 703 and web-forms 704 refer to root documents of other webpages, contained in other transactions. Embedded documents may be picture files, sound files, java programs, etc. All items 700-705 are contained in various transactions within a session. More specifically, all items 700-705 are stored in the response bodies 405 of transactions 400. The reason for this is that in HTTP communications, the client requests a document, and the server sends that document in a response. If a document has other documents embedded in it, that document will comprise references (usually URLs) of the other documents. Thus, for example, page root document 700 comprises URLs of frames 701, 705.

The body based unit 522 must reconstruct the relationships between transactions in webpages (see FIG. 7). For that purpose the body based unit 522 first finds a transaction that contains a page root document 700. Page root documents 700 are identified by the following method. Existing page root documents are checked for references to other page root documents. If a document is referenced as a link or a form submission of an already identified page root document then it is a page root document. If on the other hand a document is referenced as an embedded document in an already identified page root document then it is not a page root document. If a document is not referenced at all in any identified page root documents then it searched for a "text/html" content type header, which would indicate it is a page root document. If such header is not found, heuristics may be used to determine if it is a page root document. The body based unit then parses each page root document 700. Parsing these page root documents will allow the body based unit 522 to find references to other documents in the website that are embedded directly in the page root document, such as frames 701 and 705. Once these references are found the transactions that represent these other documents are found, because they contain these references in their request headers. Once these other transactions are found, they are in turn parsed to find yet more references to embedded documents. This process is repeated recursively until there are no transactions left to parse. This process results in hierarchically grouping transactions into webpages.

Figure 8:
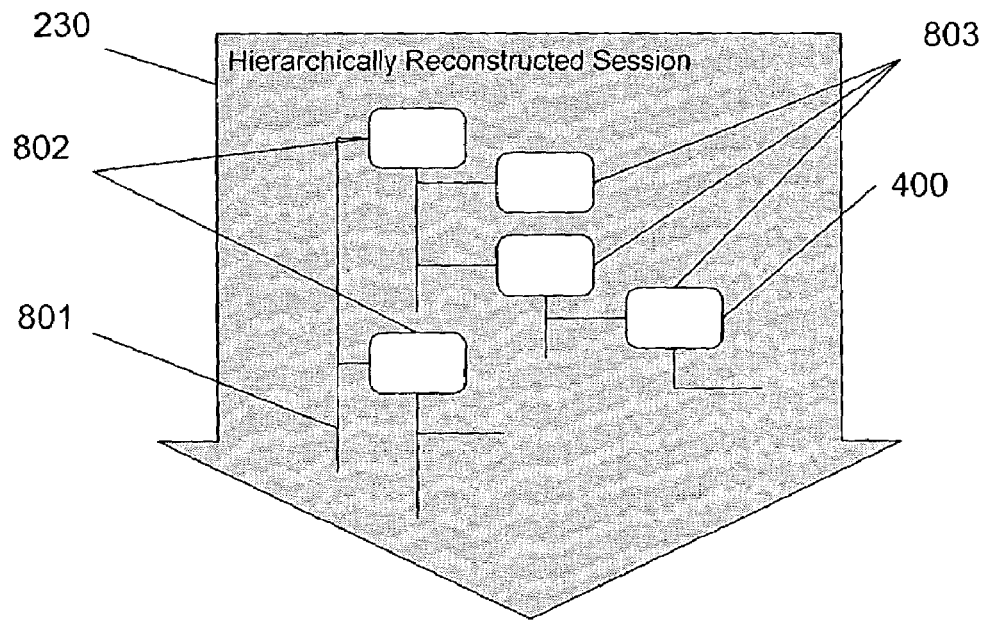
FIG. 8 is a diagram of a hierarchically reconstructed session.

After the body based unit 523 has parsed all transactions, it links the parsed transactions in a hierarchical tree 801. This tree is shown in FIG. 8, and will be described with reference to the exemplary embodiment configured to monitor HTTP communications.

The top level transactions 802 in the tree 801 represent the page root documents 700 of such web-pages. The other levels of the tree 801 include transactions 803 that represent nested documents that are sent by separate messages (or transactions), such as pictures or other embedded documents, framesets and frames. Since documents and frames can be embedded in more than one level, the tree 801 may have many levels.

Some transaction(s) from the tree 801 may be missing. There is a missing transaction if a certain first transaction contains a first HTML document which contains an HTML element that indicates that there is a second document such as an image, HTML frame, or style-sheet embedded into the first HTML document, but there is no second transaction connected to the first transaction that contains the second document. Furthermore, there may exist transactions whose message headers 402 or 403 indicate that a certain HTML document is present, but whose message bodies 405 do not include that document. Both of these possibilities result from the caching features of HTTP communications. Specifically, during a web application session, non-session specific information (such as static HTML and Image documents) may be cached in the client computer, and then used in a different web application session, without having to be sent from the server to the client for a second time. Furthermore, there may be computers between the client and the server (such as proxies) that perform caching in order to speed up communications for the client, and/or reduce bandwidth. Thus, a document that is sent to the client during a previous web application session will be placed in a transaction that is identified with the previous web application session and thus not included in the set of transactions examined by the body based unit 523. Furthermore, there may be HTTP header fields which reference other documents by specifying an URL (such as, for example HTTP refresh headers or HTTP redirections). In these situations the transaction including the other document is considered missing.

The body based unit 523 attempts to retrieve missing transactions, and replace transactions that do not have message bodies with ones that do by accessing the random access transaction memory 511. For each transaction that is missing, or does not contain a message body the body based unit 523 queries the random access transaction memory 511 using a URL. The body based unit obtains the needed URL from the parent transaction of the transaction that is missing or missing a message body in the tree 801. The needed URL is the URL referenced by the HTML element. The body based unit 523 will thus retrieve most missing documents. It will not be able to retrieve any documents that were sent to the client and cached at a time when the RTSRU 112 was not operational, because no transaction for such documents would have been created and saved.

The output of the session reconstruction module 205 and the RTSRU 122 is a hierarchically reconstructed web application session, such as the one shown in FIG. 8. This session will provide extensive information and context about the transaction of interest. And if the transaction of interest contained an error message, this session will provide enough information to assist in resolving the error. Similarly, if the transaction of interest is associated with other issues, such as an exceeded performance threshold, for example, the hierarchically reconstructed web application session will be useful in resolving these issues.

Figure 9:
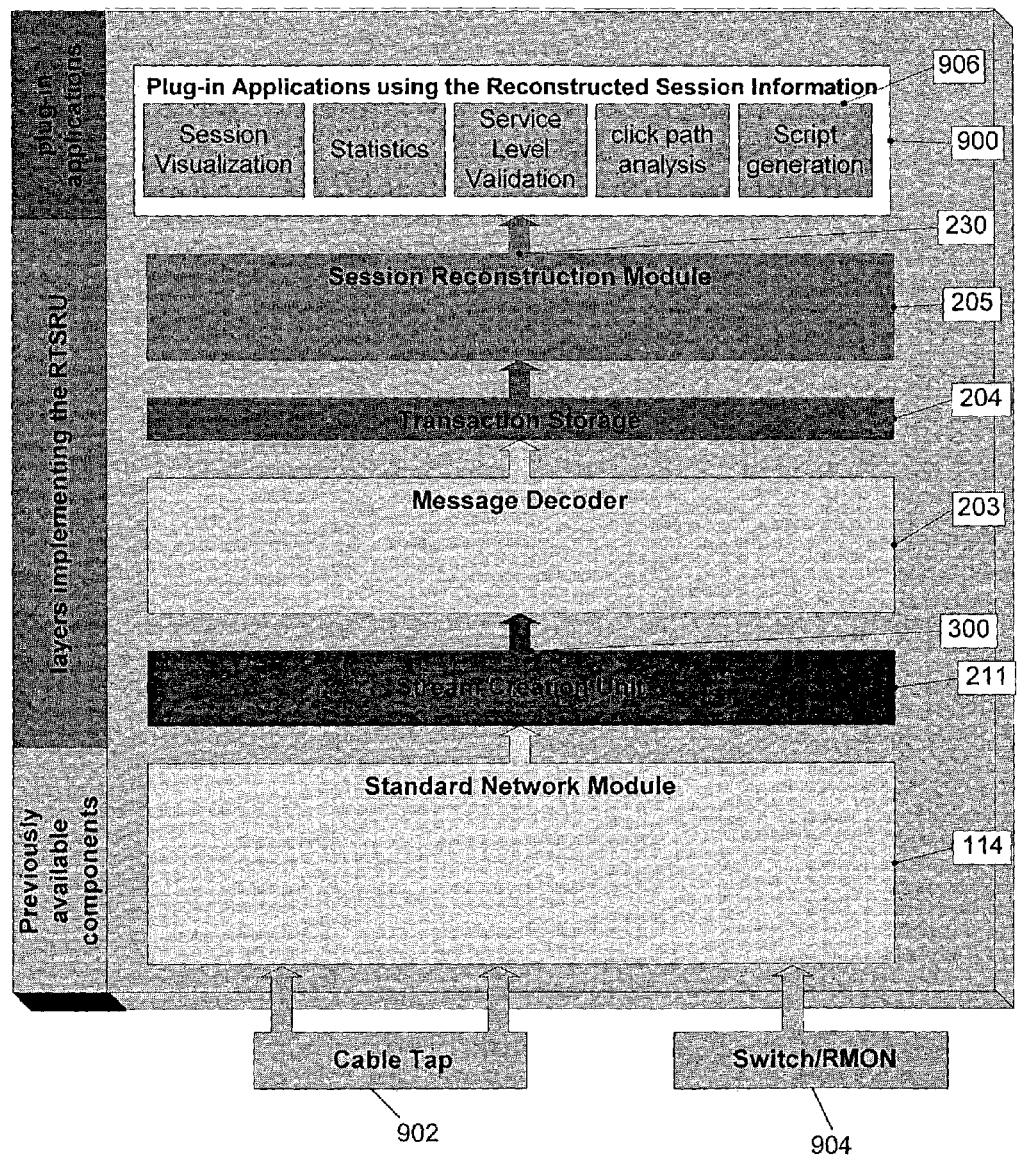
FIG. 9 is a diagram of the dataflow of the present invention.

FIG. 9 shows a layered representation of the present invention, including an overview of the data flow. Cable tap 902 or the RMON port of a switch 904, among other options, provide copied network traffic in the physical layer (layer 1). The standard network module 114 processes this data to the network layer (layer 3). The stream creation unit 211 processes the data to the transport layer (layer 4) by creating connection streams. The message decoder processes the data to the application layer (layer 7). The session reconstruction module 205 can be viewed as an additional layer (naturally not defined in the OSI model) that provides further coherence and organization to the data by placing transactions in a hierarchically reconstructed session 230. The hierarchically reconstructed session can be further used by an additional layer of plug-in applications 900, which provide information that is directly useful for a particular testing or monitoring purpose. The plug-in applications listed in FIG. 9 are only some examples of possible plug-in applications.

One plug-in application, the script generation module 906, will be described in more detail. A user may wish to repeat the client/server communication session that led to the transaction of interest. Doing so may be useful to check whether an error, or another special condition (such as, for example, special keywords, timeouts, usability problems, slow performance) has been resolved, or if an error or another special condition is repeatable under different conditions (such as, for example, different server loads), or to test the performance of different servers. The hierarchically reconstructed web application session 230 contains a tree of transactions containing a request and a response. A script generation tool may use these requests and responses to create a script, which repeats the requests in the order in which they were received by the message decoder 203 and thus recreates the web application session, described by the tree 601.

Figure 10:
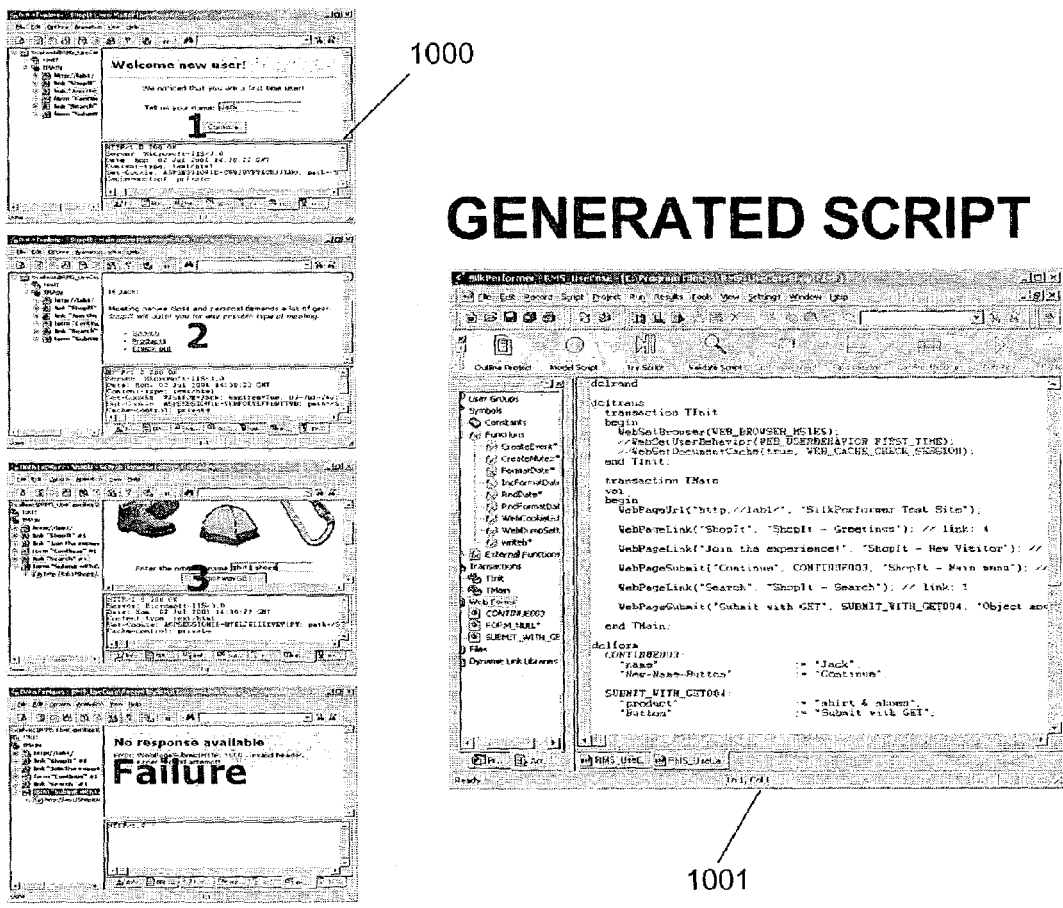
FIG. 10 is a diagram of an exemplary visualization and a generated script.

FIG. 10 shows example visual outputs of an exemplary embodiment of the present invention. A visualization 1000 of a web application session is shown. Aside from some additional markings, the webpages appear as they would have appeared to the user. Even webpages that contain frames or other multi-document pages are shown properly due to the structure of the hierarchically reconstructed web application session 230. It can be seen that this particular web application session resulted in an error. Also, a generated script 1001 is shown. Both the visualization and the generated script were created by plug-in applications, using a hierarchically reconstructed session 230.

The hierarchically reconstructed web application session may be used to monitor the operation of the server and the client's perspective or it may be entered into an archive. It may be especially useful to create archives when certain events take place. The transaction analyzer plug-in 208 may be configured to determine when an event that requires archiving takes place and then trigger the retrieval of the web application session, by sending the appropriate transaction to the session reconstruction module 205. Once a hierarchically reconstructed web application session is retrieved it may be archived. Thus, archived is not only the transaction that triggered the event but all transactions leading to the event. The web application sessions may also generate alarms when certain events arise. The hierarchically reconstructed web application session may be sent with the alarm in order to provide contextual information about the session which resulted in an alarm. This and other described functions are performed by one or more of the plug-in applications 900.

The client/server terminology does not always describe the environment of a networked computer system accurately. For example, the client and server roles cannot be specified in a Peer to Peer situation where each computer may act as a client and a server. Nevertheless, the client/server designations are useful both because of their pervasiveness in the field and because they correctly describe most commercial networking systems, where the present invention is most likely to be used. The present invention may be used by a person skilled in the art in situations where computers do not necessarily fulfill the client or server roles exclusively.

The present invention may also be used in networking environments where multiple tiers of servers are present. An example of such an environment is one where a web-server serves clients, the web-server is being served by an application server, and the application server is being served by a database server. In such an environment the present invention may be used to monitor any or all of the resulting client-server communication channels. Furthermore, while the exemplary embodiments have centered on monitoring of the server, the client may be similarly monitored using the present invention.

The exemplary embodiments described herein are centered on monitoring HTTP communications. A person skilled in the art will appreciate that the present invention may be used to monitor communications in other protocols. The present invention will be especially useful in monitoring communications having state information, i.e., communications where in order to understand the meaning of one transaction, one must look at other transactions.

It is not necessary for the client and server to be computers, the present invention may be used for monitoring any electronic devices in a networked environment.

The standard network module 114 and the RTSRU 112 may be implemented on one or more computers. The present invention may monitor multiple servers and/or as multiple clients. Multiple RTSRU's and standard network modules may be used for scalability purposes. After a slight modification of the cable-tap setup, the present invention may be used to monitor multiple communication lines.

While the foregoing description and drawings represent illustrative embodiments of the present invention, it will be understood that various changes and modifications may be made without departing from the spirit and scope of the present invention.

The invention claimed is:

1. A system for non-intrusive real-time analysis of secure communications between a first application running on a first computer and a second application running on a second computer, the first and second applications using a communication channel, the system comprising:
   a non-intrusive and secure communications capture device, connected to the communications channel;
   a network module, connected to the communications capture device and configured to process communications from a physical layer to a network layer substantially in real-time; and
   a session reconstruction unit, connected to the network module and configured to process communications to an application layer in real-time, to group communications into transactions and to arrange transactions in a hierarchical data structure according to dependencies within the information contained in the transactions, the session reconstruction unit further comprising:
   a stream creation unit, connected to the network module and configured to receive a plurality of communications and group them into a plurality of streams, and to add connection meta information to each stream, wherein each stream represents a single network connection;
   a message decoder, connected to the stream creation unit and configured to create a plurality of transactions from the communications included in the plurality of streams;
   a transaction storage, connected to the message decoder, configured to store the plurality of transactions; and
   a session reconstruction module, connected to the transaction storage, and configured to receive a transaction of interest, and to retrieve a set of transactions from the transaction storage, the set of transactions being such that each transaction belonging to the set of transactions has a predefined relationship with the transaction of interest, and to group the set of transactions in the hierarchical data structure according to dependencies within the information contained in the transactions.

2. The system of claim 1, further including a transaction analyzer module, connected to the session reconstruction unit and configured to analyze transactions as they are being created by the session reconstruction unit.

3. The system of claim 1, wherein each transaction comprises;
   transaction meta information;
   a request header; and
   a response header.

4. The system of claim 3, wherein at least one of the transactions further comprises a request body.

5. The system of claim 4, wherein the session reconstruction module further comprises:
   a meta information based transaction pre-selection unit, connected to the transaction storage, and configured to receive the transaction of interest and to retrieve a part of the set of transactions from the transaction storage, based on the transaction meta information;
   a transaction pre-selection buffer, connected to the meta information based transaction pre-selection unit, and configured to store the part of the set of transactions;
   a header based transaction correlation unit, connected to the transaction pre-selection buffer and configured to find dependencies between transactions of the part of the set of transactions based on the request headers and response headers of transactions; and
   a body based transaction correlation and hierarchical linking unit, connected to the header based transaction correlation unit and the transaction storage and configured to retrieve from the transaction storage additional transactions of the set of transactions based on the request bodies and response bodies of the part of the set of transactions already retrieved and to find dependencies between transaction of the set of transactions based on the request bodies and response bodies of the transactions of the set of transactions, and to group the set of transactions in a hierarchical data structure according to the found dependencies.

6. The system of claim 3, wherein at least one of the transactions further comprises a response body.

7. The system of claim 6, wherein the session reconstruction module further comprises:
   a meta information based transaction pre-selection unit, connected to the transaction storage, and configured to receive the transaction of interest and to retrieve a part of the set of transactions from the transaction storage, based on the transaction meta information;
   a transaction pre-selection buffer, connected to the meta information based transaction pre-selection unit, and configured to store the part of the set of transactions;

a header based transaction correlation unit, connected to the transaction pre-selection buffer and configured to find dependencies between transactions of the part of the set of transactions based on the request headers and response headers of transactions; and a body based transaction correlation and hierarchical linking unit, connected to the header based transaction correlation unit and the transaction storage and configured to retrieve from the transaction storage additional transactions of the set of transactions based on the request bodies and response bodies of the part of the set of transactions already retrieved and to find dependencies between transactions of the set of transactions based on the request bodies and response bodies of the transactions of the set of transactions, and to group the set of transactions in a hierarchical data structure according to the found dependencies.

8. The system of claim 1, wherein the message decoder comprises:

a transport protocol decoder, configured to receive a second plurality of streams, derived from the first plurality of streams, and derive a plurality of request messages and a plurality of response messages from the second plurality of streams; and a transaction assembler, connected to the transport protocol decoder and configured to receive the plurality of request messages and the plurality of response messages from the transaction protocol decoder and to combine the plurality of request messages and plurality of response messages into the plurality of transactions, wherein each transaction is created by combining a request message and a response message.

9. The system of claim 8, wherein the message decoder further comprises:

a secure traffic decryption unit, connected to the stream creation unit and to the transport protocol decoder and configured to receive the plurality of streams, wherein at least one stream within the plurality of streams is encrypted, and to decrypt the at least one encrypted stream forming a plurality of decrypted streams, wherein the second plurality of streams is derived from the plurality of streams by replacing the at least one encrypted stream with the plurality of decrypted streams.

10. The system of claim 1 further comprising a plug-in monitoring application selected from the group consisting of: a session visualization application, a statistics module, a monitoring and alerting module, a test script generation module, a service level validation module, a click path analysis module, and a customer support assistance application, the plug-in monitoring application being connected to the session reconstruction module and being configured to receive the hierarchical data structure.

* * * * *